April 6, 1954   M. S. ROSENBLATT ET AL   2,674,217
WELDING MACHINE WITH BACKUP MEANS
Filed Aug. 22, 1949   2 Sheets-Sheet 1

INVENTORS.
MORRIS SAMUEL ROSENBLATT &
LEO REUBEN DAVIS
BY   Stowell & Evans
ATTORNEYS April 6, 1954  M. S. ROSENBLATT ET AL  2,674,217
WELDING MACHINE WITH BACKUP MEANS
Filed Aug. 22, 1949  2 Sheets-Sheet 2
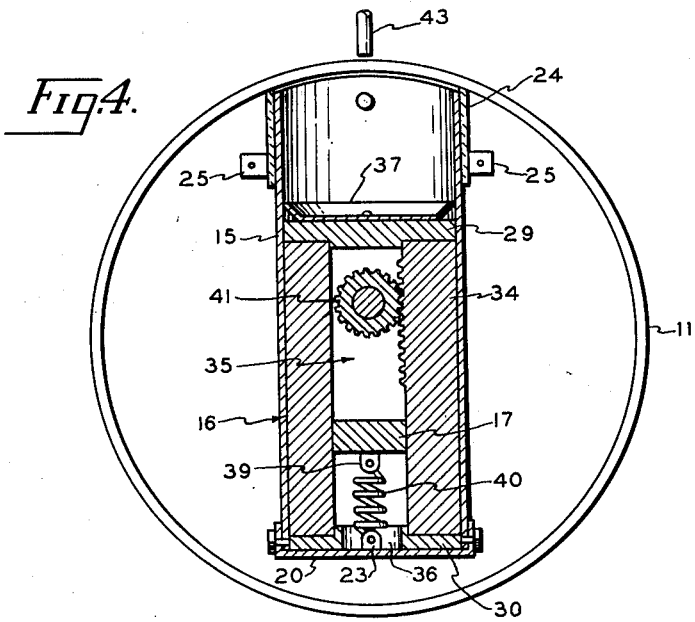
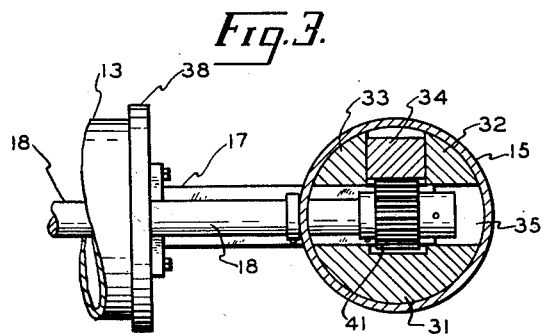
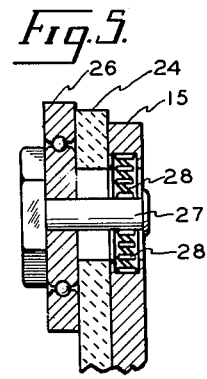
INVENTORS.
MORRIS SAMUEL ROSENBLATT &
LEO REUBEN DAVIS
BY Stowell & Evans
ATTORNEYS Patented Apr. 6, 1954

2,674,217

UNITED STATES PATENT OFFICE 2,674,217

WELDING MACHINE WITH BACKUP MEANS

Morris S. Rosenblatt and Leo R. Davis, Salt Lake City, Utah, assignors to The Eimco Corporation, Salt Lake City, Utah, a corporation of Utah Application August 22, 1949, Serial No. 111,732

8 Claims. (Cl. 113—59)

This invention relates to a process of joining metal members by welding, wherein the seam to be welded is provided with a backing-up material of the granular refractory type.

It is a particular object of the invention to provide a device for restraining a granular backing material in a movable relationship to the seam to be welded whereby access of air is excluded from the granular material.

Another object is to provide such a device that will automatically apply the granular backing material to the back surface of the weld as the welding operation proceeds.

A further object of the invention is to provide such a device having a resilient sleeve of a non-combustible material about its upper surface to provide a positive seal between the members to be welded and the container for the granular backing material.

These and other objects and advantages are provided by the apparatus of the invention for backing up a seam between members to be welded which in its preferred embodiment includes a container for a granular refractory material, a boom for supporting the container in operative relationship with the underside of the seam to be welded, means for holding the upper end of the container against the seam to exclude access of air from the granular material and means for progressively pressing the granular backing material against the seam.

The invention will be more particularly described with reference to the illustrative embodiments of the invention shown in the accompanying drawings in which:

Fig. 3 is a fragmentary section on line 3—3 of Fig. 2;

Fig. 4 is a section on line 4—4 of Fig. 2; and

Fig. 5 is an enlarged fragmentary view of the spring-urged rollers of the device.

Figure 1:
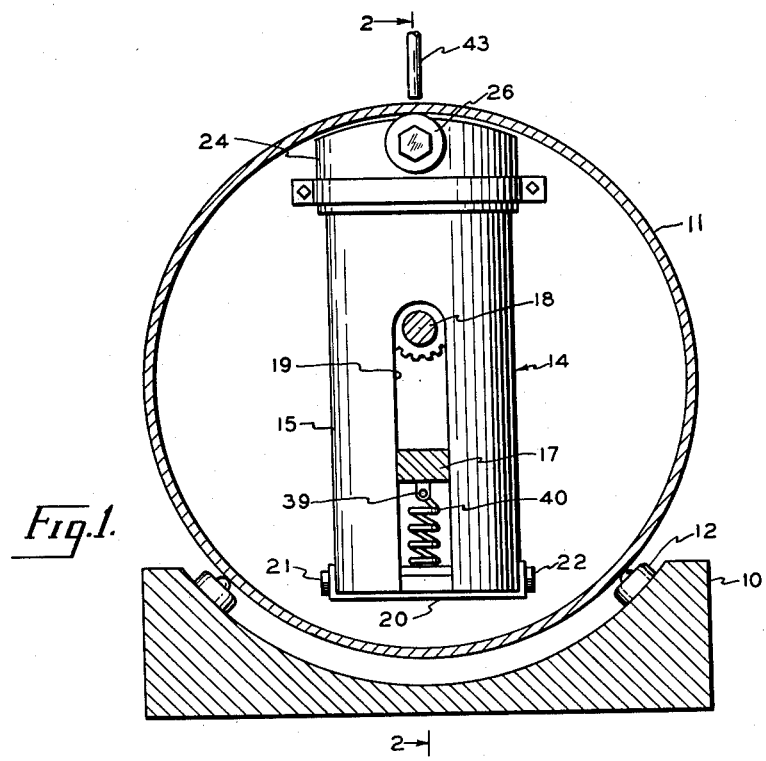
Fig. 1 is a vertical elevation of the weld backing device of the invention shown in position in a pipe to be welded.

With reference to the drawings 10 is a work-supporting frame which provides a cradle for sections of pipe, tubing, or conduits 11 to be welded. Rollers 12 are attached to the frame to facilitate rotation of the pipes within the frame 10 as the welding process progresses. A boom 13 supported, by means not shown, at one end of the work frame, extends lengthwise of the frame to provide a rigid support for the weld backing device 14 of the invention. Additional rollers may be provided on the under side of the boom 13, when additional support is needed for long booms.

The weld backing device 14, in its preferred embodiment comprises an outer cylindrical shell or canister 15, an inner piston 16, a support bar 17, and a piston actuating shaft 18.

The cylindrical shell

The outer shell 15 of the granular flux containing backing-up device 14, is cylindrical in cross-section and open at both ends.

A slot 19 cut in one section of the shell extends from its lower end to a point midway of its length.

A narrow flanged base member 20 is bolted across the bottom of the shell perpendicular to slot 19 by bolts 21 and 22. Centrally positioned upon base member 20 is an eye 23.

The upper end of the shell has a resilient sealing member 24. In the preferred form as shown in the drawings the member 24 is a sleeve of non-combustible material such as asbestos. However, on larger installations where the welding arc is a substantial distance from the sleeve, or if a larger quantity of flux is maintained between the sleeve and the arc, the resilient member need not be constructed of a non-combustible material. This sleeve may be secured to the shell by means of a retaining band 25, and is positioned with its upper end extending beyond the periphery of shell 20. When the backing-up device is to be used in welding curved or cylindrical bodies it is advantageous to have the upper periphery of the shell and the resilient sleeve curved to conform to the curved surface of the members to be welded, thus providing a more positive seal between the work and the flux-containing cylinder.

A pair of rollers 26, spring urged to extend beyond the upper periphery of shell 20 and flexible sleeve 24, are secured to the upper end of the cylindrical shell by means, for example, of an axle 27 housed in a spring-loaded bearing 28, adapted for vertical displacement. These rollers are diametrically opposed upon the shell on an axis parallel to support bar 17.

The piston

Piston 16, as shown in the drawings, is a composite member having a circular head 29 and base 30 rigidly secured to common spacer members 31, 32 and 33 and rack gear 34, or the piston may be of a unitary cast construction. As shown in Figs. 3 and 4 of the drawings the spacer members and rack gear are positioned to provide a centrally located internal passage 35, substantially the width of slot 19 in shell 15 and extending vertically between piston head and base 29 and 30. Base member 30 has a centrally located bore 36 into which eye 23 projects. A dish or cup 37 may advantageously be secured to the piston head plate 29 to receive the granular flux.

Support bar

Figure 2:
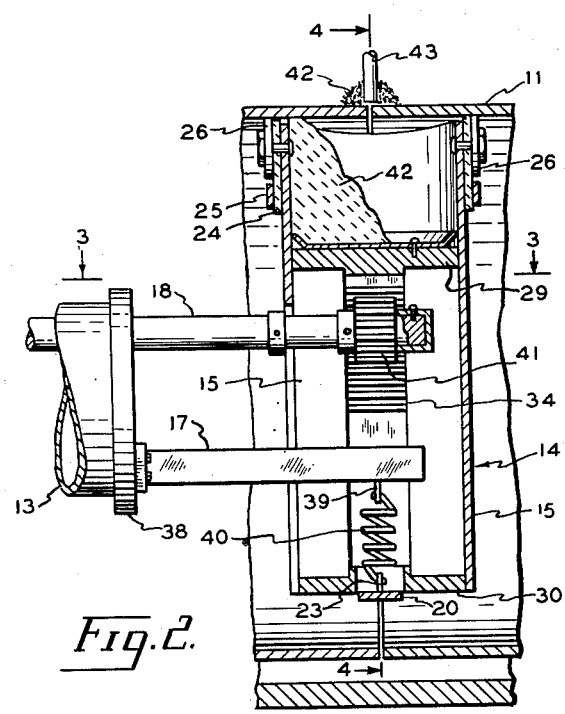
Fig. 2 is a fragmentary section on line 2—2 of Fig. 1.

The flux container supporting bar 17 is a T-shaped member adapted to be welded or bolted to face plate 38 of boom 13, and to extend laterally through slot 19 of the cylindrical shell and into the centrally located piston passage 35. An eye 39 corresponding to eye 23 of shell 15 is threadedly mounted to the underside of the bar as shown in Figs. 1 and 2 of the drawings. Eyes 23 and 39 are connected by a spring 40 of approximately thirty pounds tension, thereby flexibly connecting the cylinder to the supporting bar.

Piston drive shaft

Piston drive shaft 18 is rotatably mounted within boom 13 for rotation by any suitable device, not shown, such as an electric motor, or fluid pressure cylinder, located externally of the boom. The drive shaft extends beyond the boom 13, through slot 19 and into the piston recess 35. A pinion gear 41 is keyed to the inner end of the shaft whereby rotation of the shaft and pinion will cause the piston 10 to be raised or lowered relative to the outer cylindrical shell 15.

Operation

In welding operations using a refractory flux blanketed electrode, it is desirable to back up the weld seam with a similar refractory flux. This requires a source of flux, a means for pressing the flux against the back surface of the seam, and a means for excluding air and retaining the flux against the work. When a continuous seam is to be welded, as for example in girth welding, it is further desirable to provide a mobile apparatus having the aforementioned qualities, which are obtained by the device of the invention. With particular reference to Fig. 2 of the drawings a typical girth welding operation, using the granular flux backing-up device of the invention comprises the following steps.

Piston 16 is lowered by rotation of drive shaft 18 and pan 37 is filled with the desired granular flux 42. Next pipes 11, to be welded, are positioned upon frame 10 in abutting engagement with the seam to be welded surrounding the flux container 14.

Tension spring 40 acting between the container support bar 17 and the flanged base member 20 forces the outer shell 15 upwardly seating the flexible non-combustible sleeve 24 against the inner surface of the pipe 11, thus forming a resilient seal between the under surface of the pipe and the upper periphery of shell 15, excluding access of air from the weld and substantially preventing the escape of flux from around the upper end of the shell. It is apparent that the resilient member 24 may be U-shaped when used on installations where the pipes to be welded are rotated in only one direction or if the retaining cylinder is of small diameter a single tab of resilient material provided at the upper edge of the outer shell 15, in the direction of rotation of the pipes would restrain the flux from being dragged away. As the resilient sleeve is seated spring rollers 26 are forced downwardly until their upper periphery is substantially aligned with the top of the asbestos seal 24. Piston 16 is then raised until the granular flux 42 is pressed tightly against the under surface of the seam. Stationary weld rod 43 submerged in flux, welds the seam immediately below it. During the welding process pipes 11 are continuously rotated thus progressively bringing new sectors of the seam under the weld rod, and over the flux-containing piston. While the pipes are in rotation the spring rollers 26, the flexible asbestos sleeve 24, and the spring loaded shell 15 provide for ease of rotation and a continual seal between the under surface of the pipes and the flux container 14. In order to replace used or lost flux and to insure a substantially uniform weld throughout the pipes being welded, continual or intermittent force is applied to the flux by piston 16.

While the apparatus specifically shown and described is particularly adapted for use in backing up welds made in cylindrical or hollow members such as pipes and the like, it is equally adaptable for welding sheets, plates and angular members and such welds may be made with gas or "thermit" as well as with electric arc equipment. It is further evident that various modifications may be made in the construction of the device and in the form of the means for actuating the piston and holding the outer shell against the material to be welded without departing from the principles of the invention, for example, both shell and piston may be spring actuated or they both may be actuated by means of hydraulic cylinders.

From the foregoing description it will be seen that the present invention provides a backing-up device for a weld seam whereby the aims, objects and advantages of the invention are fully accomplished.

We claim:

1. An apparatus for backing up a seam between members to be welded comprising a vertical hollow cylindrical member, and a transverse member movably positioned within said cylindrical member and defining therewith a chamber at the upper end of said cylindrical member for granular refractory material, a flexible sleeve of non-combustible fabric attached to and projecting beyond the upper end of said cylindrical member, a boom supporting said cylindrical member in operative relationship with the underside of the seam to be welded, means carried by said boom for urging said cylindrical member in an upward direction and means carried by said boom for independently urging said transverse member in an upward direction.

2. An apparatus as defined in claim 1 including spring urged rollers at the upper end of the cylindrical member to facilitate movement between the cylindrical member and the members to be welded.

3. An apparatus for backing up a seam between members to be welded comprising a vertical hollow cylindrical member, and a transverse member movably positioned within said cylindrical member and defining therewith a chamber at the upper end of said cylindrical member for granular refractory material, a flexible sleeve of non-combustible fabric attached to and projecting beyond the upper end of said cylindrical member, said flexible sleeve conforming to the peripheral configuration of the cylindrical member at its upper end, a boom supporting said cylindrical member in operative relationship with the underside of the seam to be welded, means carried by said boom for yieldingly urging said cylindrical member in an upward direction and means carried by said boom for independently urging said transverse member in an upward direction.

4. An apparatus for backing up a seam between members to be welded as defined in claim 3 wherein the means yieldingly urging said cylindrical member in an upward direction comprises a spring acting between said boom and said cylindrical member.

5. An apparatus for backing up a seam between members to be welded comprising a vertical hollow cylindrical member and a reciprocating piston slidable mounted within said cylindrical member and defining therewith a chamber at the upper end of said cylindrical member for granular refractory material, a flexible sleeve of non-combustible fabric attached to and projecting beyond the upper end of said cylindrical member, a boom supporting said cylindrical member in operative relationship with the underside of the seam to be welded, a spring connecting the cylindrical member and the boom for yieldingly urging said cylindrical member in an upwardly direction, and means independently urging said piston in an upward direction, said means including a rack attached to the piston and a pinion carried by said boom and actuated by means external of the container engaging the rack.

6. An apparatus for backing up a seam between members to be welded as defined in claim 5 wherein the non-combustible sleeve is asbestos.

7. An apparatus for backing up a seam between members to be welded comprising a vertical hollow cylindrical member supported against the underside of the seam to be welded, a transverse member movably positioned within said cylindrical member and defining therewith a chamber at the upper end of said cylindrical member for granular refractory material, a flexible sleeve of non-combustible fabric attached to and projecting beyond the upper end of said cylindrical member, and means urging said transverse member in an upward direction for pressing the refractory material against the seam.

8. In a welding machine, including means for movably supporting members to be welded in abutting engagement comprising a vertical hollow cylindrical member, and a transverse member movably positioned within said cylindrical member and defining therewith a chamber at the upper end of said cylindrical member for granular refractory material, a flexible sleeve of non-combustible fabric attached to and projecting beyond the upper end of said cylindrical member, a boom supporting said cylindrical member in operative relationship with the underside of the seam to be welded, means carried by said boom for urging said cylindrical member in an upward direction and means carried by said boom for independently urging said transverse member in an upward direction.

References Cited in the file of this patent

UNITED STATES PATENTS

| Number | Name | Date |
|---|---|---|
| 383,246 | Benardos | Aug. 21, 1888 |
| 1,964,926 | Moss | July 3, 1934 |
| 1,983,930 | Carlsen | Dec. 11, 1934 |
| 2,089,840 | Rockefeller | Aug. 10, 1937 |
| 2,139,771 | Riemenschneider | Dec. 13, 1938 |
| 2,145,009 | Keir | Jan. 24, 1939 |
| 2,157,983 | Giougie | May 9, 1939 |
| 2,275,235 | Shanklin | Mar. 3, 1942 |
| 2,294,439 | Bagley | Sept. 1, 1942 |
| 2,331,689 | Hodge | Oct. 12, 1943 |
| 2,331,937 | Schreiner | Oct. 19, 1943 |
| 2,336,283 | Neill | Dec. 7, 1943 |
| 2,365,226 | Stout | Dec. 19, 1944 |
| 2,376,593 | Hellen | May 22, 1945 |
| 2,380,396 | Berthold | July 31, 1945 |
| 2,412,065 | Rudy | Dec. 3, 1946 |
| 2,441,176 | Wilson | May 11, 1948 |
| 2,474,075 | Talley | June 21, 1949 |